Feb. 10, 1953     C. H. RUNNELS     2,627,868

HYDRAULIC VENT VALVE

Filed Sept. 7, 1950

INVENTOR
CLARENCE H. RUNNELS
By
Toulmin & Toulmin
ATTORNEYS.

Patented Feb. 10, 1953

2,627,868

UNITED STATES PATENT OFFICE 2,627,868

HYDRAULIC VENT VALVE

Clarence H. Runnels, Nashville, Tenn.

Application September 7, 1950, Serial No. 183,631

5 Claims. (Cl. 137—198)

This invention relates to a hydraulic vent valve, and particularly to a valve for use in a hydraulic system which will automatically vent air from the system while preventing the loss of fluid from the system and also preventing the entrance of air into the system through the valve.

In most hydraulic systems, particularly oil hydraulic systems, it is important that all air be eliminated from the system in order to prevent hammering of the hydraulic fluid when pressure is applied thereto and to prevent loss of power and time which comes about by virtue of the compressibility of the air when pressure is applied to the system.

It is also important to maintain systems of this nature free of air because corrosion and rusting tend to occur in the presence of air.

This invention also contemplates the use of a vent valve of the nature referred to in connection with compressed air systems wherein it is desired to maintain the system bled free of liquid without losing any of the compressed air through the venting valve. The reason for bleeding fluids from a compressed air system is that in practically all cases it is desired for the air to be dry when used, and, further, the points at which air is taken from a compressed air system are generally at the end of a run of conduit, so that any liquids in the air system tend to accumulate at the point of use of the air creating an undesirable situation.

In general, a valve constructed so as to embody my invention consists of a valve body having a cavity therein with a port at each end of the cavity surrounded by a valve seat. A valve member within the cavity is adapted for engagement with either seat and is preferably hollow so as to be buoyant under the influence of hydraulic fluids.

The cavity is preferably elongated and circular in cross-section, and the valve takes the form of a capsule having rounded ends engageable with the valve seats. A predetermined amount of clearance about the valve member permits limited movement thereof within the cavity and assists in maintaining the valve seats and the end of the valve member clean at all times and a limited area of both the seat and the end of the valve member is worn in during operation of the valve because of the freedom of the valve member to tilt on its axis and also to rotate, whereby a high degree of efficiency of sealing between the valve seat and the valve member obtain at all times.

The particular object of this invention is to provide a valve of the type referred to embodying the above characteristics, and which is relatively inexpensive to manufacture.

Another object is to provide a valve of the type referred to capable of withstanding any pressure normally encountered in hydraulic or pneumatic systems.

A still further object is the provision of a hydraulic vent valve which is highly efficient in operation at all times.

A particular object of this invention is the provision of a hydraulic vent valve having a valve body and a valve member so arranged that only a limited area of the valve member is utilized for engaging the valve seat, whereby the valve member and valve seat will wear together to a substantially perfect seal.

An important feature in connection with the valve of my invention is that the valve member is so constructed as to be buoyant in all fluids that will be encountered in hydraulic systems of any type, whether the fluid be water, oil, gasoline, alcohol, or any of the other liquids employed in fluid power systems or other systems involving the flow of liquid chemicals or the like.

The foregoing objects and other objects and advantages will become more apparent upon reference to the following description taken in connection with the accompanying drawings in which.

Figure 1:
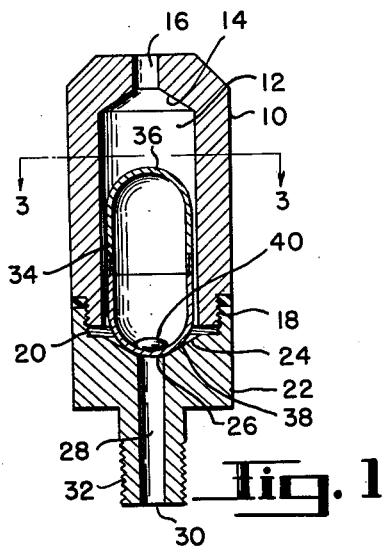
Figure 1 is a vertical section through a valve constructed according to my invention showing the valve member engaging the lower seat of the valve.
Figure 2:
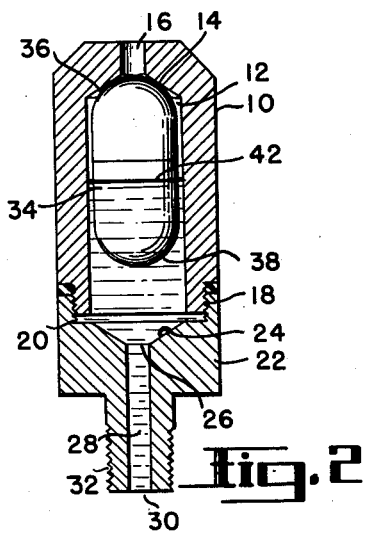
Figure 2 is a view like Figure 1 but showing the valve member in elevation and in engagement with the upper seat of the valve.
Figure 3:
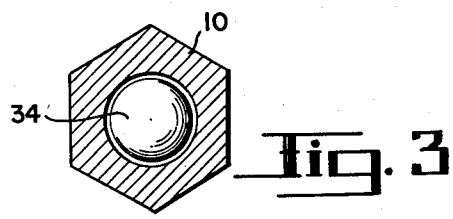
Figure 3 is a transverse section indicated by line 3—3 on Figure 1 showing the clearance between the valve member and the wall of the cavity in the valve body by means of which limited freedom of movement of the valve member is had.

Referring to the drawings somewhat more in detail, the valve shown in Figures 1, 2, and 3 comprises a main body part 10 having a cylindrical cavity 12 extending therein from the lower end and terminating in a ground seat 14 surrounding a vent port 16. The lower end of body part 10 is externally threaded, as at 18, for connection with the threaded part 20 of the lower valve body part 22. Body part 22 also includes a ground seat 24 surrounding port 26 that communicates through channel 28 with inlet port 30 of the valve. The lower end of body part 22 may be turned and threaded, as at 32, for connection of the valve into a hydraulic system.

Positioned within cavity 12 is the generally cylindrical valve member 34 having rounded ends, as at 36 and 38. The valve member is preferably hollow to give it buoyancy and is made in two parts so as to be separable for placing in the valve a weight 40, which may take the form of a pool of mercury. It will be evident that in Figure 1 the valve member is engaged with seat 24 and that, therefore, no air can pass downwardly through the valve.

In Figure 2, a predetermined quantity of liquid, such as oil or water, has entered the valve through the inlet port thereof and established a liquid level at 42 which has lifted the valve member until its upper rounded member 36 has engaged seat 14, thereby effectively sealing the upper end of the valve to prevent the escape of liquid through port 16.

It will be evident that the action of the valve member can be regulated by the amount of weight placed therein, and that for different hydraulic fluids it will be desired to employ different degrees of added weight to the valve member.

The manner in which the weight is supplied to the valve member is of importance because it tends to permit more or less free vibratory or lateral movement of the valve member within the cavity of the valve body, while at the same time tending to urge the valve member toward an upright position. This ability of the valve member to vibrate or oscillate laterally within the valve body makes its action very "live," whereby the smallest amount of air entering the inlet port will cause the valve member to move on its seat to permit the air to escape.

This action of the valve member is also of importance in maintaining my valve in efficient operating condition at all times. This comes about because the elongated valve member has only a certain limited freedom of movement within the cavity of the valve body, whereby only a limited area at each end of the valve member is effective for engaging the adjacent valve seat.

Because of this, the movement of the valve member laterally within the valve body has a tendency to wear in this limited area on each end of the valve member and the adjacent seat to a highly effective seal. This is in contra-distinction to an arrangement employing a ball type valve member, because such a member is free to rotate about its center, and thus tends to bring all parts in engagement with the valve seats, thereby not only inhibiting the wearing in of a proper seat on the ball, but also preventing a proper wearing in of the valve seat, because the different portions of the surface of the ball are not formed to the same spherical shape.

With my arrangement, each end of the valve member properly wears in with its adjacent seat, and because of the limited area being worn, minor surface irregularities which, in a ball type valve member, would prevent the proper wearing in of the valve member and seat, are readily worn down and do not detract from the operating efficiency of the valve.

Figure 4:
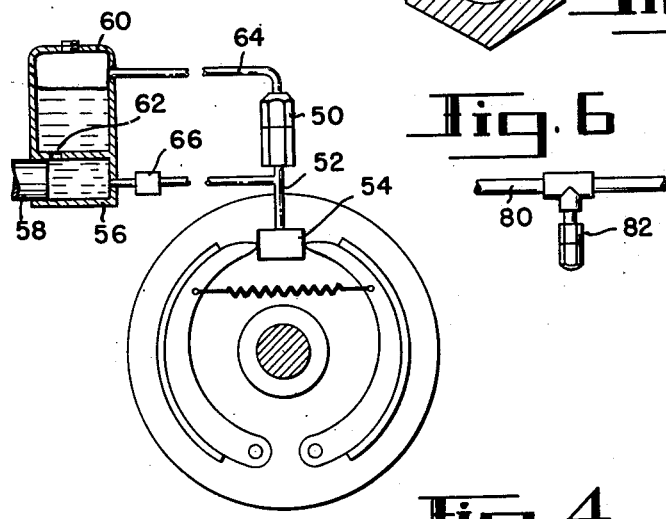
Figure 4 is a diagrammatic view showing how the valve of this invention can be connected into a hydraulic braking system of the type employed on passenger cars and trucks for the purpose of maintaining the system free of air at all times.

In Figure 4, I show how the valve according to my invention can be applied to a hydraulic braking system to maintain the valve free of air at all times. In Figure 4, the valve, indicated at 50, has its lower end connected into conduit 52 leading to brake cylinder 54 from master cylinder 56. Plunger 58 in master cylinder 56 displaces hydraulic fluid to the brake cylinder in the usual manner. Reservoir 60 is mounted on top of master cylinder 56 and communicates therewith through port 62.

In the normal hydraulic system, the valve member within valve 50 will normally be supported against the upper valve seat, due to the fact that these systems usually include a restrictor valve 66 which maintains a predetermined minimum amount of fluid in the brake cylinder at all times. This fluid would be sufficient to maintain the valve against the upper seat due to buoyancy except when air entering the valve 50 from conduit 52 would permit lowering of the valve member.

In the normal hydraulic system, the valve member within valve 50 will normally be supported against the upper valve seat, due to the fact that these systems usually include a restrictor valve 66 that maintains a predetermined minimum pressure in the brake cylinder at all times. This pressure would be sufficient to maintain the valve member against the upper valve seat, except when air entering valve 50 would permit lowering of the valve member.

Figure 5:
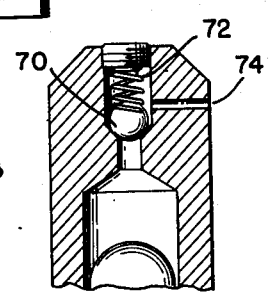
Figure 5 is a fragmentary sectional view of the upper end of a vent valve showing a somewhat modified form of construction.

In Figure 5 I show a modified arrangement wherein the return conduit 64 of Figure 4 could be eliminated. The arrangement in Figure 5 employs a ball check 70 urged closed by spring 72 which will lift and vent air through passage 74, at a predetermined pressure. In the Figure 5 arrangement dust and foreign matter is prevented from entering the valve body, but any time the brakes of the vehicle are applied, thereby building up pressure in the system, any air within the valve body sufficient to hold the valve member off its upper seat will be driven out past ball check 70 and through passage 74 to the atmosphere.

Figure 6:
Figure 6 is a view showing a valve according to my invention connected into a pneumatic system and bleeding liquids therefrom.

It has been mentioned that the valve of this invention can also be used on a pneumatic system, and an arrangement of this type is illustrated in Figure 6 wherein a conduit 80 exemplifies the pneumatic system, and the valve of my invention is indicated at 82 connected into conduit 80 so as to depend therefrom reversed from the position it occupies in Figures 1 through 4.

It will be evident that in Figure 6 the valve member normally rests on the seat of the valve that surrounds the port opening to atmosphere, and this will normally prevent the escape of air from the pneumatic system. However, any accumulation of liquid within the cavity of the valve body will cause the valve member to be lifted off its seat, and this liquid then expelled. It will be apparent that the valve member is preferably weighted so as to retain a certain amount of liquid within the valve body in Figure 6, because the sealing action between the valve member and body will be augmented by having the mating surfaces thereof wet.

It will be noted that in any of the arrangements described in connection with my invention, the characteristics of the valve can be modified, not only by changing the length of the cavity in the valve body and the weighting of the valve member, but also by varying the angle of the valve seats. A variation in the angle of the valve seats would vary the effective radius of the point of engagement of the valve member with the valve seat, and thereby provide for a larger or smaller unbalanced area of the valve member for urging it against the said seat. The differential between the closing and opening pressure can thus be varied, and the characteristics of the valve modified to suit any particular conditions of operation.

From the foregoing, it will be seen that the valve which I have invented offers a number of advantages, some of the more important of which may be enumerated as follows:

1. The valve is simple in construction and therefore inexpensive to manufacture, consisting as it does of only three parts.

2. The valve member or capsule is variable in weight, thereby to adapt it to different circumstances.

3. The valve operates positively to prevent the escape of one fluid from a system while permitting the escape therefrom of another fluid and preventing the reentry of the said other fluid into the system.

4. The elongated capsule type valve member and the limited freedom of movement that it has provides for a wearing in of substantially perfect sealing areas on the valve member and valve body.

The hollow valve member is buoyant in all liquids normally encountered in liquid filled systems and is brought into or out of sealing engagement with the valve ports solely due to its floating action in the liquid. This is an important feature because it is not necessary for pressure to be developed in the system in order to effect a good seal of the valve member with either valve seat. Pressure built up in the system will assist in seating the valve member tightly against its seat, but the sealing of the valve member against its seat is accomplished by its floating characteristics.

It will be understood that this invention is susceptible to modification in order to adapt it to different usages and conditions, and, accordingly, it is desired to comprehend such modifications within this invention as may fall within the scope of the appended claims.

I claim:

1. In a vent valve: a valve body having a vertically extending cylindrical cavity, said body being formed with a port at each end opening axially into said cavity, said cavity being formed at each end with a conical valve seat surrounding said ports, and an elongated generally cylindrical valve member in said cavity movable from engagement with one of the valve seats into engagement with the other valve seat, said member being hollow and having rounded ends to engage said seat and being of smaller diameter than said cavity.

2. In a vent valve: a valve body having a vertically extending cylindrical cavity, said body being formed with a port at each end opening axially into said cavity, said cavity being formed at each end with a conical valve seat surrounding said ports, and an elongated generally cylindrical valve member in said cavity movable from engagement with one of the valve seats into engagement with the other valve seat, said member being hollow and having rounded ends to engage said seat, said member also comprising separable parts whereby a weight can be placed inside the member to vary its characteristics, and said member being smaller in diameter than said cavity.

3. In a vent valve; a valve body having a vertically extending cylindrical cavity, said body being formed with a port at each end opening axially into said cavity, said cavity being formed at each end with a conical valve seat surrounding said ports, and an elongated generally cylindrical valve member in said cavity movable from engagement with the other valve seat, said member being hollow and having rounded ends to engage said seat, said member having a weight loosely disposed therein, said member being substantially longer than the diameter of said cavity but being smaller in diameter than the cavity.

4. In a vent valve of the type described; a valve body comprising separable parts which define a vertically extending cylindrical cavity when assembled, a conical valve seat at each end of said cavity, said body being formed with a port at each end opening axially into said cavity through the centers of said seats, a cylindrical valve member having semi-spherical ends thereon in said cavity to permit the passage of fluids through the cavity, said valve member being hollow and the space inside the valve member also being cylindrical with rounded ends, and mercury inside the valve member for providing weight to give the valve member the desired specific gravity and to urge it generally toward an upright position within the said cavity, said valve member having a clearance completely therearound in said cavity.

5. In a vent valve of the type described; a valve body comprising separable parts which define a vertically extending cylindrical cavity when assembled, a conical valve seat at each end of said cavity, said body being formed with a port at each end opening axially into said cavity through the centers of said seats, a cylindrical valve member having semispherical ends thereon in said cavity and smaller in diameter than the cavity to leave a clearance about the valve member to permit the passage of fluids through the cavity, said valve member being hollow and the space inside the valve member also being cylindrical with rounded ends, and mercury inside the valve member for providing weight to give the valve member the desired specific gravity and to urge it generally toward an upright position within the said cavity, the clearance between the valve member and the wall of the said cavity being such that the valve member can tilt in the cavity only a slight amount, thereby limiting the area on each end of the valve member which will wear in with the corresponding one of the valve seats in the body.

CLARENCE H. RUNNELS.

REFERENCES CITED

The following references are of record in the file of this patent:

UNITED STATES PATENTS

| Number | Name | Date |
| --- | --- | --- |
| 116,608 | Lungren | July 4, 1871 |
| 708,332 | Ennor | Sept. 2, 1902 |
| 779,599 | Hatch | Jan. 10, 1905 |
| 1,459,486 | Whitney | June 19, 1923 |
| 1,873,396 | Hallenbeck | Aug. 23, 1932 |
| 1,873,403 | Higgins | Aug. 23, 1932 |
| 1,873,782 | Nixon | Aug. 23, 1932 |
| 2,137,525 | Carroll | Nov. 22, 1938 |
| 2,313,773 | Samiran | Mar. 16, 1943 |

FOREIGN PATENTS

| Number | Country | Date |
| --- | --- | --- |
| 416,329 | France | Aug. 4, 1910 |